United States Patent [19]

Waters

[11] 3,966,442
[45] June 29, 1976

[54] ODOR MASKING AND FILTERING ASHTRAY

[75] Inventor: Bruce M. Waters, Nashville, Tenn.

[73] Assignee: Aladdin Industries, Incorporated, Chicago, Ill.

[22] Filed: Sept. 30, 1974

[21] Appl. No.: 510,644

[52] U.S. Cl. ............................. 55/316; 55/318; 55/385 G; 55/471; 55/482; 55/501; 55/504; 55/507; 131/231
[51] Int. Cl.$^2$ .......................................... B01D 50/00
[58] Field of Search ............. 55/316, 318, 350, 385, 55/387, 467, 471, 472, 482, 503, 504, 507, 509, 511; 131/231, 238, 242, 240 R, 241

[56] References Cited
UNITED STATES PATENTS

| 1,037,145 | 8/1912 | Houser, Jr. | 55/509 |
|---|---|---|---|
| 1,438,615 | 12/1922 | Shover | 55/507 X |
| 1,604,470 | 10/1926 | Newnham | 55/507 |
| 2,205,377 | 6/1940 | Miller | 131/240 R |
| 2,644,467 | 7/1953 | Breidert | 131/238 |
| 3,212,416 | 10/1965 | Boersma | 55/509 UX |
| 3,250,063 | 5/1966 | Andrews | 55/507 X |
| 3,362,416 | 1/1968 | Jackson | 55/385 UX |
| 3,490,466 | 1/1970 | Warnock | 131/238 |
| 3,503,520 | 3/1970 | Meyer | 131/241 X |
| 3,516,232 | 6/1970 | Gilbertson | 55/467 X |
| 3,577,710 | 5/1971 | Feldman | 55/316 |
| 3,797,205 | 3/1974 | Weisskopf | 55/385 |
| 3,828,530 | 8/1974 | Peters | 55/482 X |
| D129,426 | 9/1941 | Jindrak | 131/240 R X |
| D191,254 | 8/1961 | Barron et al. | 131/240 R X |

*Primary Examiner*—Frank W. Lutter
*Assistant Examiner*—Kathleen J. Prunner

[57] ABSTRACT

An odor masking ashtray is constituted by an ashtray provided with openings in its side for the insertion of cigars, cigarettes and pipes serving as a base supporting a housing in which is mounted a fan positioned between two filters so that smoke and other objectionable odors may be drawn upwardly from the ashtray through the filters and in the process filtered out of the air and/or masked.

9 Claims, 3 Drawing Figures

ODOR MASKING AND FILTERING ASHTRAY

BACKGROUND OF THE INVENTION

This invention relates generally to odor masking ashtrays. More specifically, it relates to improvements in such ashtrays providing a compact aesthetically pleasing and effective device for that purpose.

To the applicant's knowledge there have been a number of attempts to provide effective odor masking ashtrays in the prior art. Those devices with which the applicant is familiar suffer the disadvantage of bulk and generally are not aesthetically satisfying. The latter element is a factor of some moment for an ashtray is, of course, in the nature of furnishing whether it be used in the home, office or in a public place. Typical of the devices which are bulky or somewhat massive is the ashtray shown in the U.S. Pat. to Ray, No. 2,029,192 which is in the form of a smoking stand and is therefore of some size occupying considerable space and requiring that a door in its side be opened for cleaning purposes. Another disadvantage of the Ray device is that the cigarette or whatever it may be is received at an open top so that there is no assurance that all of the smoke or objectionable odors will be drawn into the filtering arrangement shown. Another device with which the applicant is familiar is that shown in the U.S. Pat. to Fike, No. 3,807,148 which once again utilizes an ashtray with an open top and depends upon a moving air curtain to seal off the smoke and objectionable odors from the room. This device also requires that the smoke drawn off be itself recirculated to form the air curtain and it would seem that the life of the filter used would be considerably diminished as the result. Another example of an open top type ashtray is that shown in the U.S. Pat. to Weisskoph, No. 3,797,205 which depends upon a plurality of tubes through which air is being drawn to exhaust the smoke and odor. The U.S. Pat. to Gilbertson, No. 3,516,232 likewise uses essentially an open ashtray and depends upon a remote fan to draw the smoke and odor through the filtering arrangement.

The U.S. Pats. to Marsh, No. 3,733,168 and Warnock, No. 3,490,466 disclose the use of ashtrays combined with kerosene lamps positioned above the ashtray and depend upon the heat produced by a burning wick to draw the smoke and odor upwardly where they may be dissipated or filtered. Such a device of course requires that the kerosene be replenished and introduces the risk of a fire hazard so that they may be inappropriate for use in many locations.

Therefore, it is an object of this invention to provide a novel smoke filtering and odor masking ashtray which is effective to cause all of the smoke and objectionable odors to be drawn through a filtering arrangement and thereby trapped or masked.

It is another object of this invention to provide a novel smoke filtering and odor masking ashtray which can be manufactured as a relatively compact device and designed in a number of aesthetically satisfying ways.

BRIEF SUMMARY OF THE INVENTION

The foregoing and other objects are achieved in one embodiment of the invention by the provision of an ashtray base provided with openings in its side to receive items being smoked and supporting a housing in which are provided filtering means and a fan for drawing smoke and odors from the ashtray through the filtering means.

BRIEF DESCRIPTION OF THE DRAWINGS

The invention itself may be understood by reference to the claims appended hereto and forming a part of this specification while an understanding of an embodiment thereof may be had by reference to the detailed description taken in conjunction with the drawings in which:

DETAILED DESCRIPTION

Figure 1:
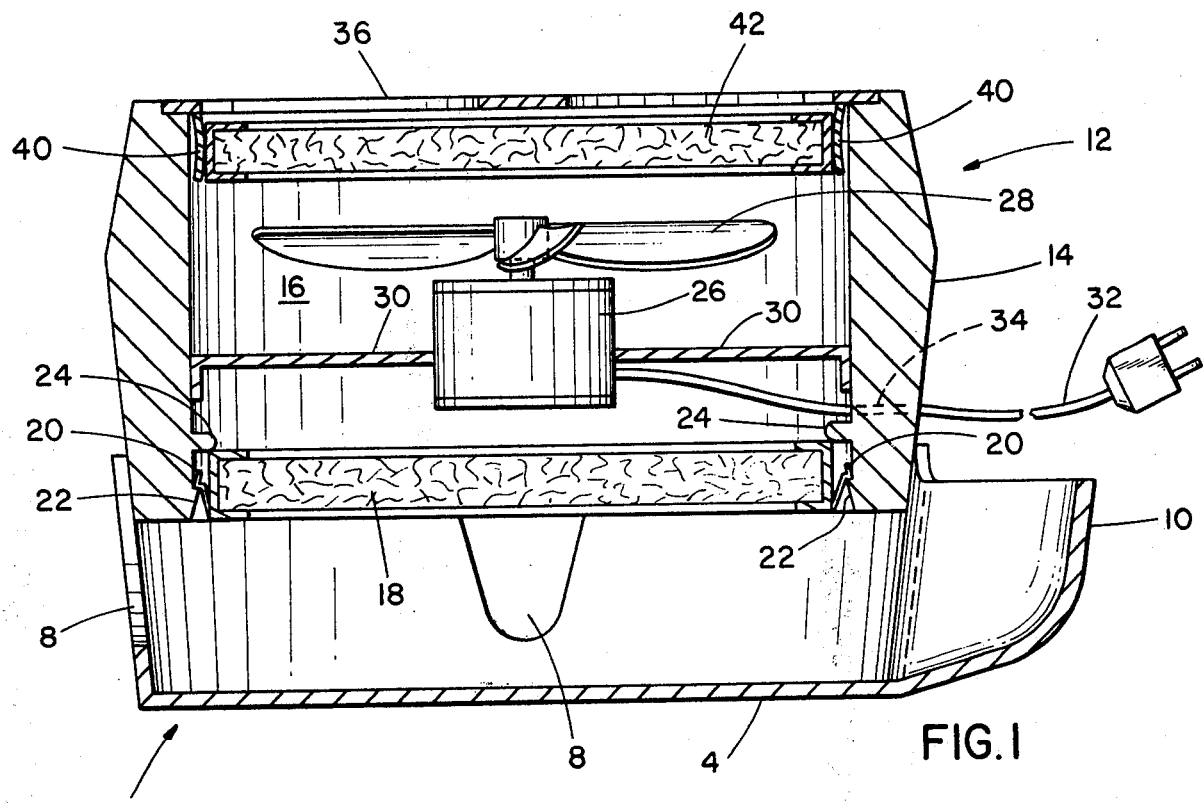
FIG. 1 is a side view partially in section of an embodiment of the invention.
Figure 2:
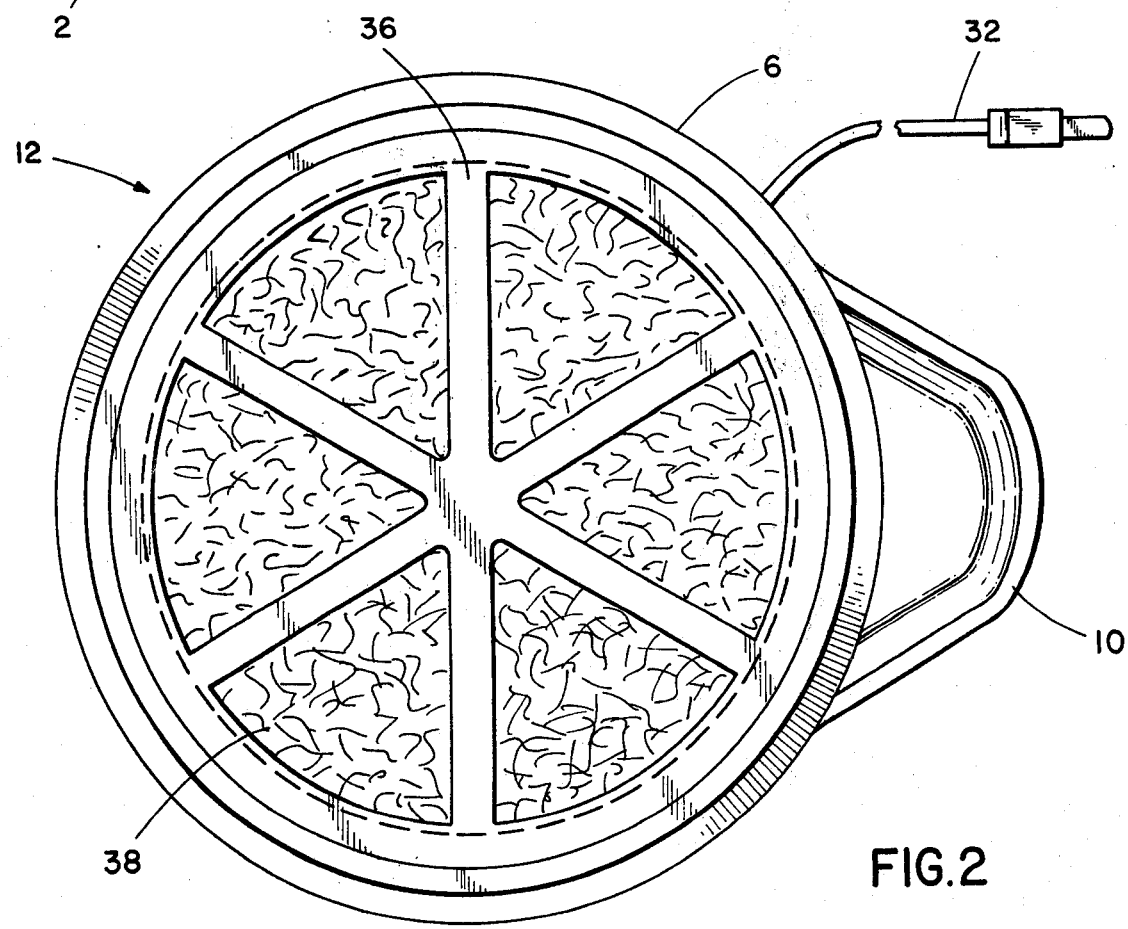
FIG. 2 is a top view of the embodiment of the invention shown in FIG. 1.
Figure 3:
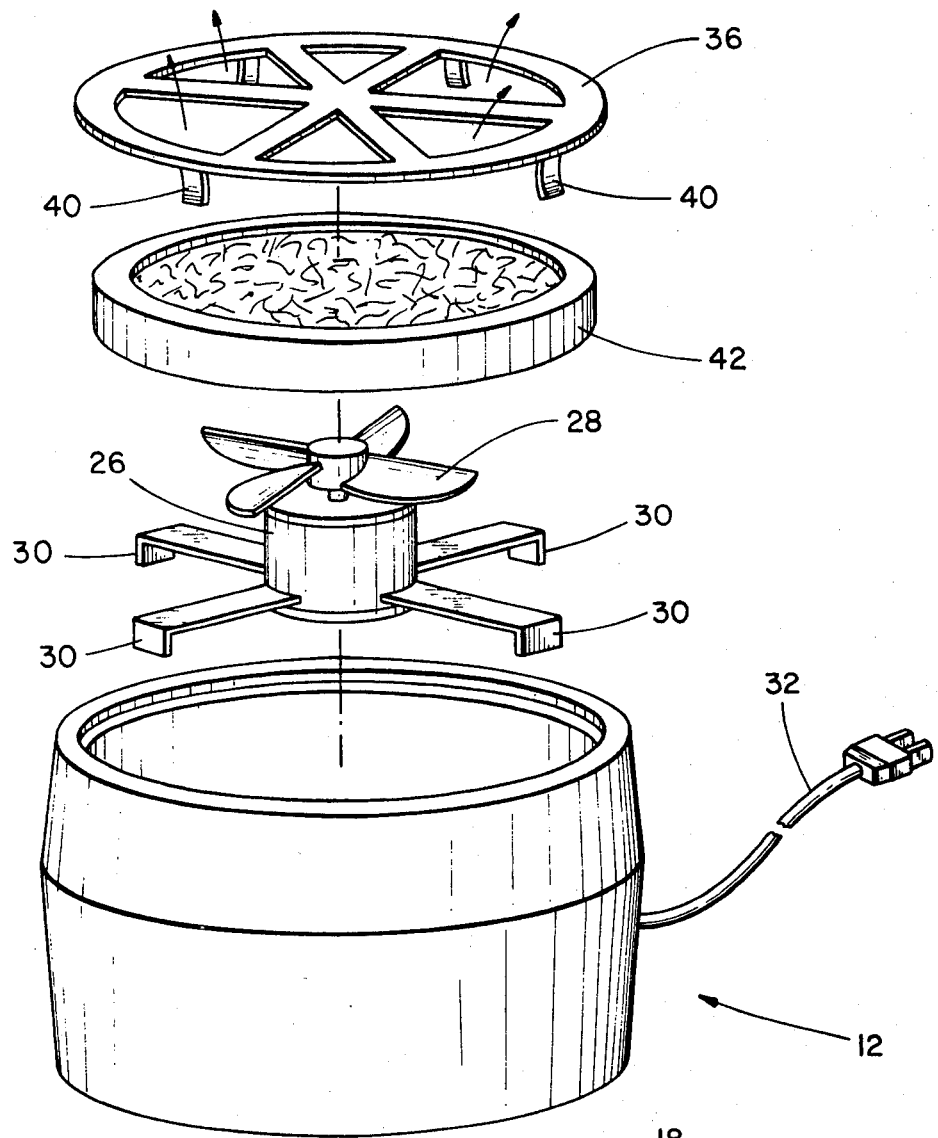
FIG. 3 is an exploded perspective illustration of the embodiment of the invention shown in FIG. 1.
Figure 3:
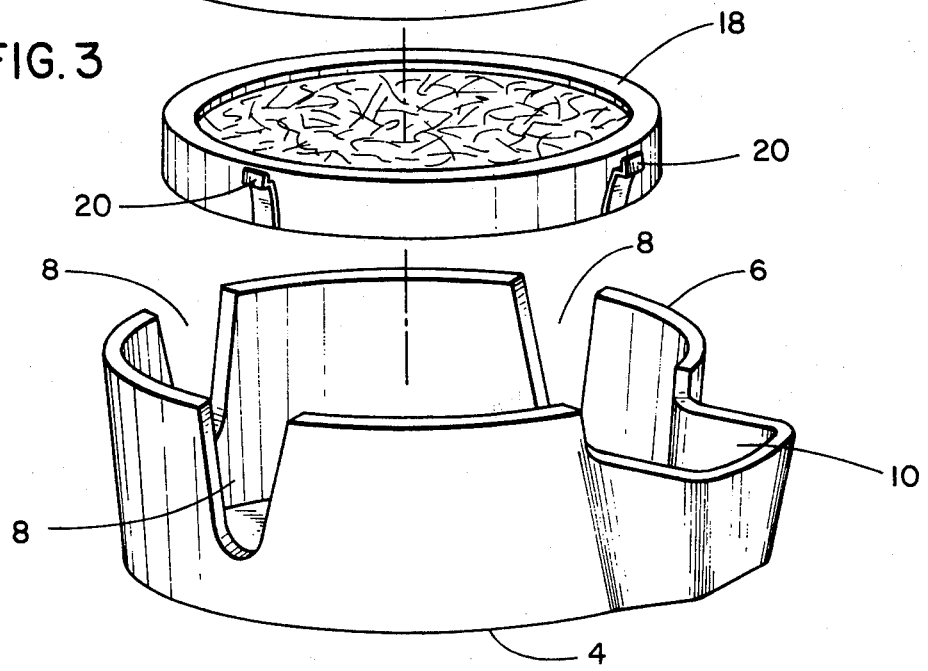

An ashtray in accordance with the invention is constituted by a base 2 in the form of an ashtray having a bottom 4 and a side wall 6. Provided in the side wall 6 are a plurality of openings 8 which, as may be seen, are made sufficiently large to permit the easy insertion of a cigar, cigarette or pipe and at the same time to permit a user to knock off the ashes of the item being smoked. If desired, a portion of the ashtray can be formed to be provided with an enlarged opening 10 in the nature of a spout extending outwardly from the side. Such a spout could be used conveniently by a pipe smoker and the size of the openings 8 perhaps reduced somewhat. The ashtray base 2 could be formed by molding any suitable plastic material having the necessary mechanical strength and able to withstand the elevated temperatures that would be encountered.

Removably mounted in the open top of the ashtray base 2 is a housing 12 which, as with the base, may likewise be molded out of a plastic material. The housing is formed as an annular element having a side wall 14 and providing an interior space 16. As may be seen in the drawings, the side wall 6 may taper slightly outwardly from the ashtray base while the side 14 of the housing 12 may taper inwardly toward its center so that the housing, when mounted on top of the ashtray, extends in its open top a slight distance as determined by the relative dimensions of the two parts.

Mounted in the bottom of the open space 16 is a filter structure 18 which may be constituted by activated charcoal supported in a plastic ring and open at its top and bottom to permit the passage of air therethrough. The filter 18 can be retained in the housing 12 by molding or otherwise providing spring latches 20 on its side engageable over wedge-shaped detents 22 molded on the interior surface of the side 14. Thus, when it becomes necessary to replace the filter the spring latches 20 may be depressed permitting the filter to be removed from the housing 12. In order to limit the upper movement of the filter 18 into the housing 12, a number of dogs or bosses 24 may be provided at spaced positions on the interior surface of the side 14.

Mounted above the filter 18 is a fan driven by a motor 26 and provided with a plurality of blades 28. The fan is mounted in the housing by providing supports 30 extending from the motor 26 and attached in any suitable or desired fashion to the interior surface of the side 14. A cord 32 for supplying electrical energy through the motor is passed through an opening 34 in the side 14 and may of course be plugged into any convenient electrical outlet.

The top of the housing 12 is covered by a protective member 36 supported thereon and formed by molding a piece of plastic to have a plurality of openings 38 to permit the passage of air therethrough and yet at the same time be sufficiently small so as to discourage the insertion of fingers or other objects therethrough. Extending downwardly from the undersurface of the protective element are a plurality of spring clips 40 positioned around the periphery thereof to receive and retain a second filter element 42 in the housing. The second filter element may be constituted by any suitable absorbent material retaining any one of a number of commercial odor masking compounds available.

It should be appreciated that the embodiment shown and described is for purposes of exemplification only for obviously the design details may be varied. That is to say, the manner of retaining the filters 18 and 40 in the housing 12 can obviously be done in a number of different ways. The particular shape and relative dimensions of the parts may likewise be varied to suit a designer.

In use, the device assembled, as shown in FIG. 1, and the motor 26 is operating to drive the fan blades 28 drawing air through the openings 8 upward through the filters 18 and 42 to discharge to the atmosphere through the openings 38 in the protective element 36. Any item being smoked may be passed through one of the openings 8 to dispose of its ashes and to rest in the ashtray when not in use. The charcoal filter 18 is, of course, effective to remove particulate material while the filter 42 will serve to mask objectionable odors that may remain. When it is desired to clean the ashtray, all that need be done is to remove the housing 12 from the ashtray 2 permitting the ashtray to be emptied and cleaned as desired. Whenever it is necessary to do so, the filter 42 may be replaced by lifting the protective element 36 which carries that filter with it and simply removing it from the retaining springs 40. Likewise, the filter 18 may be easily replaced by lifting the housing 12 and releasing its latch springs 20.

Because the ashtray 2 is enclosed except for the openings 8 and/or spout 10, if such is provided, the smoke and odors are enclosed therein. The apparatus, therefore, is relatively efficient permitting the use of a smaller, quieter fan using less electrical energy.

The invention itself is set forth with particularity in the claims appended hereto and it is intended by those claims to cover all variations which come within their scope.

What is claimed as new and desired to be secured by Letters Patent of the United States is:

1. A filtering ashtray apparatus comprising: an ashtray base having a vertically extending side wall provided with openings therein sufficiently large to accommodate items being smoked and to permit their movement therein; an annular housing on the top of said ashtray base extending therein to rest on the side wall thereof enclosing said ashtray base except for said openings; said openings extending below the bottom of said housing; filter means mounted in said housing; and a motor driven fan mounted in said housing for drawing air and smoke in said ashtray through said openings, through said filter means and out of the top of said housing.

2. The filtering ashtray of claim 1 wherein said filter means is constituted by a first filter means and a second filter means and said motor driven fan is mounted between said filter means.

3. The filtering ashtray of claim 2 including a protective member on top of said housing and provided with openings therein permitting the passage of air therethrough.

4. The filtering ashtray of claim 3 wherein said second filter means is retained on said protective member.

5. The filtering ashtray of claim 4 wherein said first filter means is provided with spring retaining means to hold it within said housing.

6. The filtering ashtray of claim 5 wherein said second filter means is retained on said protective element by spring retainers.

7. The filtering ashtray of claim 6 wherein said first filter means is constituted by an activated charcoal filter.

8. The filtering ashtray of claim 7 wherein said second filter means includes an odor masking compound.

9. The filtering ashtray of claim 1 wherein an open top spout is provided in said side wall of said ashtray.

* * * * *